United States Patent
Kojima et al.

(10) Patent No.: US 12,216,517 B2
(45) Date of Patent: Feb. 4, 2025

(54) TERMINAL APPARATUS HAVING STORAGE CONTROLLER AND POWER SOURCE WITH RELIABLE DATA STORAGE FUNCTION

(71) Applicant: Yokogawa Electric Corporation, Tokyo (JP)

(72) Inventors: Osamu Kojima, Musashino (JP); Jun Naraoka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 12 days.

(21) Appl. No.: 18/020,149

(22) PCT Filed: Jun. 1, 2021

(86) PCT No.: PCT/JP2021/020896
§ 371 (c)(1),
(2) Date: Feb. 7, 2023

(87) PCT Pub. No.: WO2022/038857
PCT Pub. Date: Feb. 24, 2022

(65) Prior Publication Data
US 2023/0333620 A1      Oct. 19, 2023

(30) Foreign Application Priority Data

Aug. 18, 2020    (JP) ................. 2020-138188

(51) Int. Cl.
*G06F 1/30* (2006.01)
*G06F 1/28* (2006.01)
(Continued)

(52) U.S. Cl.
CPC ................. *G06F 1/30* (2013.01); *G06F 1/28* (2013.01); *G06F 3/0653* (2013.01);
(Continued)

(58) Field of Classification Search
CPC ............ G06F 1/30; G06F 1/28; G06F 3/0653; G06F 11/2015; G06F 11/3058; G06F 13/1668

See application file for complete search history.

(56) References Cited

U.S. PATENT DOCUMENTS

| 7,092,613 B1 * | 8/2006 | Ide | G11B 31/00 386/277 |
| 2004/0078663 A1 * | 4/2004 | Inaba | G06F 1/30 714/22 |
| 2006/0020855 A1 | 1/2006 | Okada et al. | |

(Continued)

FOREIGN PATENT DOCUMENTS

| JP | H06332808 A | * | 12/1994 | ............. G06F 12/16 |
| JP | 2004-38290 A | | 2/2004 | |

(Continued)

OTHER PUBLICATIONS

EPO machine translation JP-H06332808A (Year: 1994).*
Extended European Search Report (EESR) dated Jul. 1, 2024 for European Patent Application No. 21858008.2.

*Primary Examiner* — Glenn A. Auve
(74) *Attorney, Agent, or Firm* — RANKIN, HILL & CLARK LLP

(57) ABSTRACT

A terminal apparatus includes a storage configured to write data outputted from a data output apparatus to a medium, a controller configured to control the storage, and a first power source configured to supply power to the controller and the storage. The controller is configured to control the storage to stop writing the data in a case in which a power outage and/or a voltage drop in the first power source is detected.

12 Claims, 3 Drawing Sheets

(51) Int. Cl.
  *G06F 3/06*    (2006.01)
  *G06F 11/20*   (2006.01)
  *G06F 11/30*   (2006.01)
  *G06F 13/16*   (2006.01)
(52) U.S. Cl.
  CPC ...... *G06F 11/2015* (2013.01); *G06F 11/3058* (2013.01); *G06F 13/1668* (2013.01)

(56) References Cited

U.S. PATENT DOCUMENTS

| | | | | |
|---|---|---|---|---|
| 2008/0127229 | A1* | 5/2008 | Keener | G06F 9/4411 |
| | | | | 719/325 |
| 2008/0250256 | A1* | 10/2008 | Hagiwara | G06F 1/30 |
| | | | | 713/300 |
| 2010/0080057 | A1* | 4/2010 | Reuter | G11C 5/141 |
| | | | | 365/185.04 |
| 2010/0162082 | A1* | 6/2010 | Umezawa | G06F 11/1441 |
| | | | | 714/763 |
| 2013/0097458 | A1* | 4/2013 | Sekino | G06F 11/1441 |
| | | | | 714/E11.138 |
| 2015/0103179 | A1* | 4/2015 | Galvin | H04N 21/274 |
| | | | | 348/159 |
| 2018/0349240 | A1 | 12/2018 | Ji et al. | |
| 2020/0293209 | A1* | 9/2020 | Ito | G06F 3/0653 |
| 2020/0401351 | A1* | 12/2020 | Taguchi | G06F 3/0604 |
| 2021/0263104 | A1* | 8/2021 | Zhu | H01M 10/486 |

FOREIGN PATENT DOCUMENTS

| | | |
|---|---|---|
| JP | 2007-66232 A | 3/2007 |
| JP | 2009-70363 A | 4/2009 |
| JP | 2010-146362 A | 7/2010 |
| JP | 2010-231548 A | 10/2010 |
| JP | 2020-53768 A | 4/2020 |

* cited by examiner

FIG. 1 Comparative Example
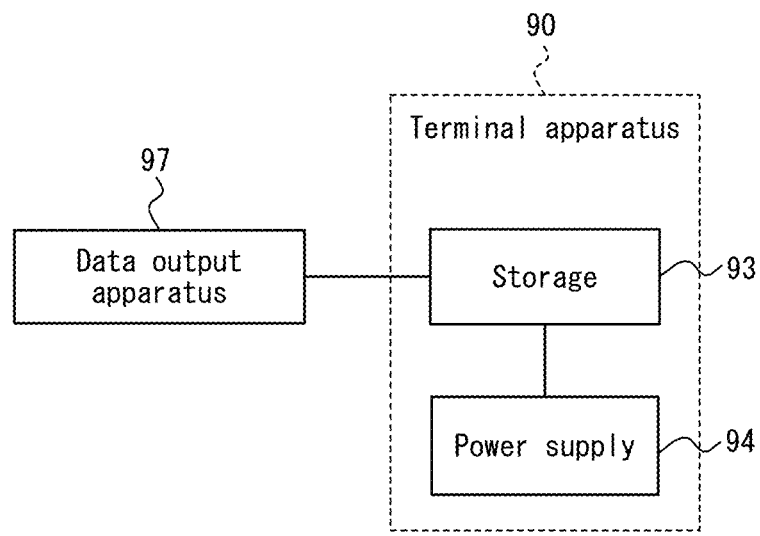
FIG. 2
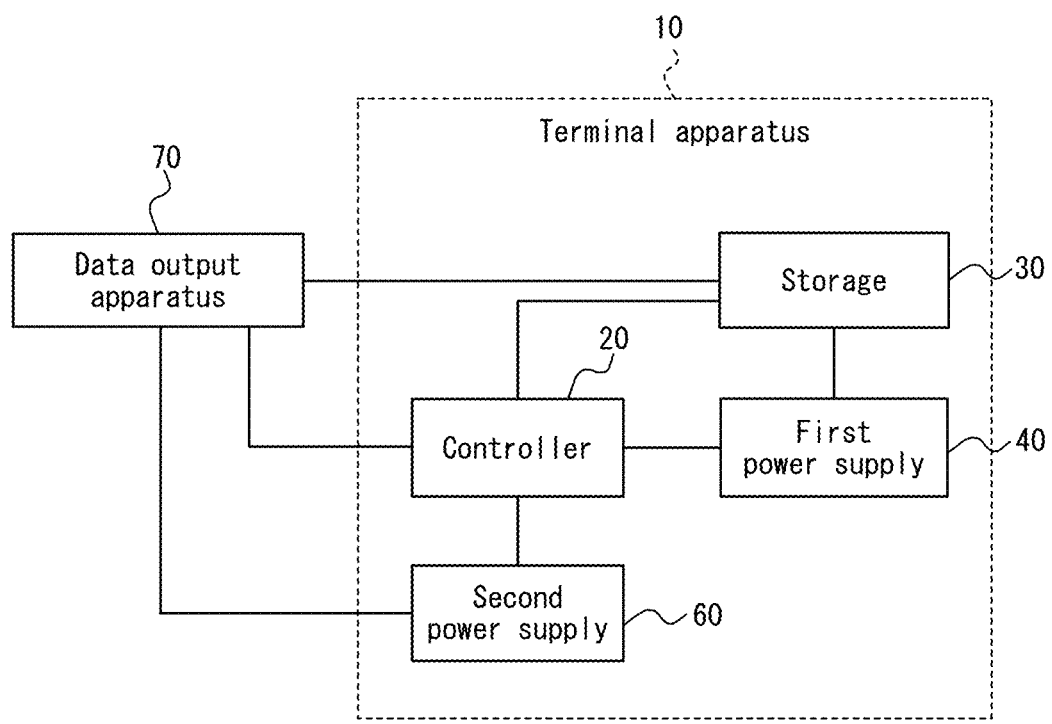

TERMINAL APPARATUS HAVING STORAGE CONTROLLER AND POWER SOURCE WITH RELIABLE DATA STORAGE FUNCTION

CROSS-REFERENCE TO RELATED APPLICATION

The present application claims priority to Japanese Patent Application No. 2020-138188 filed on Aug. 18, 2020, the entire contents of which are incorporated herein by reference.

TECHNICAL FIELD

The present disclosure relates to a terminal apparatus.

BACKGROUND

A gateway device for acquiring image data from an image sensor is known. See, for example, Patent Literature (PTL) 1.

CITATION LIST

Patent Literature

PTL 1: JP 2020-53768 A

SUMMARY

A terminal apparatus according to several embodiments includes a storage configured to write data outputted from a data output apparatus to a medium, a controller configured to control the storage, and a first power source configured to supply power to the controller and the storage. The controller is configured to control the storage to stop writing the data in a case in which a power outage and/or a voltage drop in the first power source is detected.

BRIEF DESCRIPTION OF THE DRAWINGS

In the accompanying drawings:

FIG. 1 is a circuit diagram of a terminal apparatus according to a comparative example;

FIG. 2 is a block diagram illustrating an example configuration of a terminal apparatus according to an embodiment;

DETAILED DESCRIPTION

Figure 3:
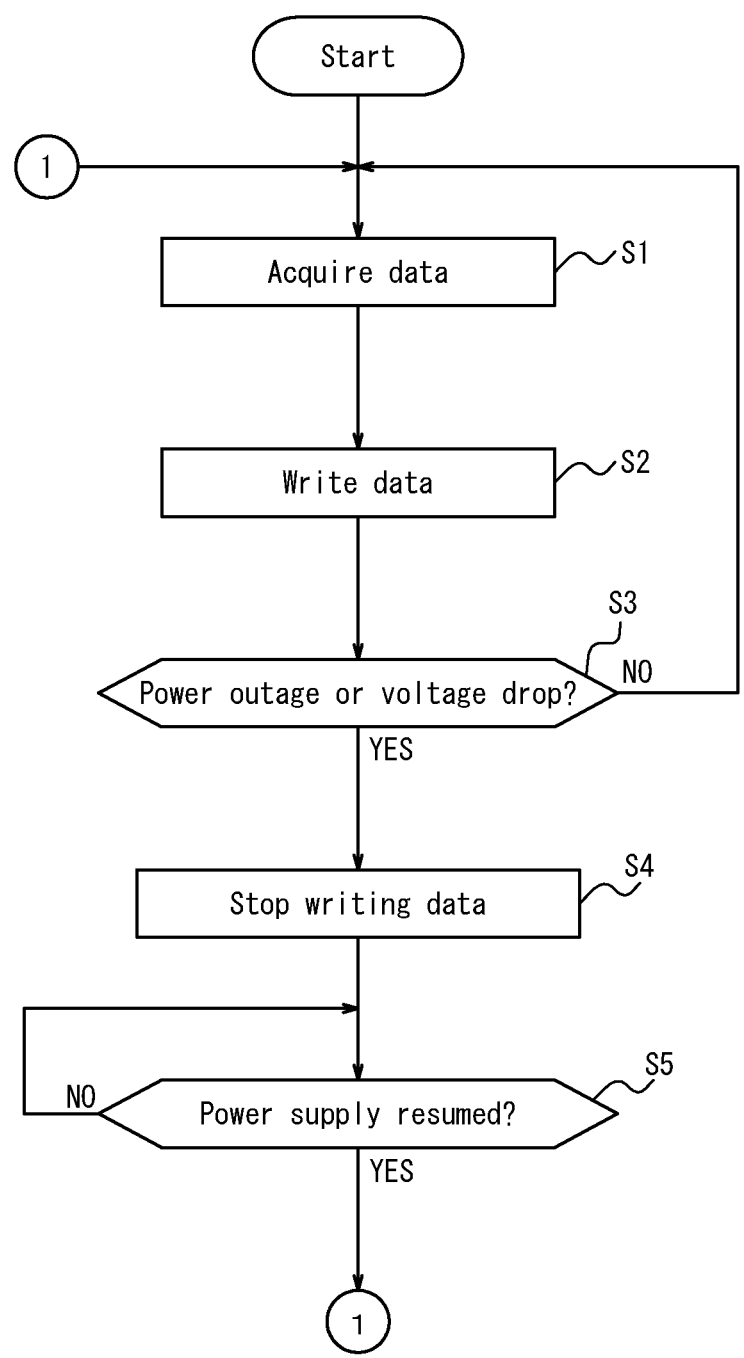
FIG. 3 is a flowchart illustrating example procedures of a method of controlling a terminal apparatus.

In gateway devices, there is a need to improve the reliability of functions for storing various types of data, not only image data. In light of the above-described points, it is an aim of the present disclosure to provide a terminal apparatus that can improve the reliability of a data storage function.

A terminal apparatus according to several embodiments includes a storage configured to write data outputted from a data output apparatus to a medium, a controller configured to control the storage, and a first power source configured to supply power to the controller and the storage. The controller is configured to control the storage to stop writing the data in a case in which a power outage and/or a voltage drop in the first power source is detected. In this way, the storage is less likely to fail. Consequently, the reliability of data storage by the terminal apparatus improves.

A terminal apparatus according to an embodiment may further include a memory configured to store the data temporarily and output the data to the storage. The controller may be configured to control the memory to stop writing the data in a case in which a power outage and/or a voltage drop in the first power source is detected. In this way, the memory or the storage is less likely to fail. Consequently, the reliability of data storage by the terminal apparatus improves.

In a terminal apparatus according to an embodiment, the controller may be configured to control the data output apparatus to stop outputting the data in a case in which a power outage and/or a voltage drop in the first power source is detected. In this way, unnecessary data output by the data output apparatus is reduced. The convenience of the terminal apparatus thereby improves.

A terminal apparatus according to an embodiment may further include a second power source configured to supply power to the data output apparatus. The controller may be configured to stop the supply of power from the second power source to the data output apparatus in a case in which a power outage and/or a voltage drop in the first power source is detected. In this way, unnecessary power supply to the data output apparatus is reduced. The convenience of the terminal apparatus thereby improves.

In a terminal apparatus according to an embodiment, the terminal apparatus may be used as a gateway terminal to acquire and record image data from a camera as the data output apparatus. In this way, images are stably recorded by the terminal apparatus, which can store data in a highly reliable manner. As a result, the convenience in surveillance applications is improved.

According to the present disclosure, a terminal apparatus that can improve the reliability of a data storage function is provided.

Embodiments of the present disclosure are described while being compared to a comparative example.

Comparative Example

As illustrated in FIG. 1, a terminal apparatus 90 according to a comparative example includes a storage 93 and a power source 94. The storage 93 acquires and stores data outputted by a data output apparatus 97. The storage 93 operates on electric power supplied by the power source 94. When the power source 94 becomes unable to supply power, the storage 93 stops operating.

The storage 93 writes the data acquired from the data output apparatus 97 to a medium. The storage 93 writes the data to a medium such as a magnetic disk or flash memory, for example. In a case in which the power supply from the power source 94 stops while the storage 93 is performing the operation of writing data to the medium, the probability of the storage 93 failing increases. In a case in which the storage 93 fails, the storage 93 will be unable to resume writing of data even if the power supply from the power source 94 resumes. Consequently, the reliability of the data storage function in the terminal apparatus 90 is reduced.

In the case of using the terminal apparatus 90 in edge computer gateway applications, it is also difficult to repair a failed terminal apparatus 90 and resume the writing of data. Consequently, the reliability of the data storage function in the terminal apparatus 90 is reduced.

As described above, the terminal apparatus 90 according to the comparative example is problematic in terms of reliability of the data storage function.

A terminal apparatus 10 (see FIG. 2) that can improve the reliability of the data storage function is therefore described in the present disclosure. The terminal apparatus 10 may be used in edge computer gateway applications. The terminal apparatus 10 may be used as a gateway terminal for the Internet of Things (IoT).

Embodiment of the Present Disclosure

As illustrated in FIG. 2, a terminal apparatus 10 according to an embodiment of the present disclosure includes a controller 20, a storage 30, and a first power source 40. The terminal apparatus 10 acquires data from a data output apparatus 70 and stores the data in the storage 30.

Example Configuration of Terminal Apparatus 10

An example of each configuration of the terminal apparatus 10 is described below.

Storage 30

The storage 30 may be configured as a SSD (Solid State Drive), an HDD (Hard Disk Drive), or the like. The storage 30 can store data by writing data to a medium such as a magnetic disk, flash memory, USB (Universal Serial Bus) memory, or SD card. The data stored in the storage 30 can be used by being outputted to an external device through communication via a network or the like. The data stored in the storage 30 may be used by a user removing the medium.

Controller 20

The controller 20 controls the storage 30 to cause the storage 30 to acquire data or write data. The controller 20 may also control the data output apparatus 70 to start and stop outputting data.

The controller 20 may, for example, be configured by a processor such as a central processing unit (CPU). The controller 20 may implement predetermined functions by having the processor execute a predetermined program. The controller 20 may include a memory. The memory may store various information used for operations of the controller 20, programs for implementing the functions of the controller 20, and the like. The memory may function as a working memory of the controller 20. The memory may, for example, be a semiconductor memory. The memory may be included in the controller 20 or may be configured as a separate entity from the controller 20.

Power Source

The first power source 40 supplies power to the controller 20 and the storage 30. In other words, the controller 20 and the storage 30 operate on power supplied from the first power source 40.

The terminal apparatus 10 may further include a non-essential second power source 60. The second power source 60 supplies power to the data output apparatus 70. The second power source 60 is controlled by the controller 20 to supply or not supply power to the data output apparatus 70. In other words, the controller 20 can control the operation of the data output apparatus 70 by controlling the power supply from the second power source 60 to the data output apparatus 70.

The first power source 40 and the second power source 60 may be configured to include a regulator or the like.

Data Output Apparatus 70

The data output apparatus 70 connected to the terminal apparatus 10 may, for example, be configured to include a camera such as a surveillance camera. In a case of being configured to include a camera, the data output apparatus 70 outputs image data. The data output apparatus 70 may, for example, be configured to include a sensor, such as a temperature sensor. In a case of being configured to include a sensor, the data output apparatus 70 outputs measurement data of the sensor. The terminal apparatus 10 stores data, such as image data or measurement data, outputted from the data output apparatus 70 in the storage 30.

Example Operations of Terminal Apparatus 10

An example of operations of the terminal apparatus 10 is described below.

The data output apparatus 70 outputs data to the storage 30 of the terminal apparatus 10. The storage 30 acquires data from the data output apparatus 70. The storage 30 stores data by writing the acquired data to a medium. In a case of not acquiring data from the data output apparatus 70, the storage 30 does not write data to the medium.

In a case in which the power supply from the first power source 40 stops, or the output voltage of the first power source 40 drops, the storage 30 might stop. The suspension of the power supply from the first power source 40 for a predetermined time or longer is also referred to as a power failure of the first power source 40. A drop in the output voltage of the first power source 40 to a predetermined value or less is also referred to as a voltage drop of the first power source 40.

In a case in which the storage 30 stops in the middle of writing data to the medium, the medium may fail. The data being written to the medium may become unreadable. In a case in which the medium is a memory such as flash memory, the memory cells may fail. In a case in which the medium is a magnetic disk, the magnetic head or magnetic recording surface may fail.

Even if a power failure or voltage drop in the first power source 40 occurs, the storage 30 can continue to operate for a predetermined time. In a case of detecting that a power failure or voltage drop in the first power source 40 has occurred, the controller 20 of the terminal apparatus 10 stops the write operation by the storage 30 within the predetermined time. In this way, the storage 30 is less likely to fail. Consequently, the reliability of data storage by the terminal apparatus 10 improves.

Specifically, the controller 20 monitors whether the first power source 40 is continuing to supply power. In other words, the controller 20 monitors the occurrence of a power failure and/or a voltage drop in the first power source 40. In a case in which a power failure and/or a voltage drop in the first power source 40 is detected, the controller 20 determines that the storage 30 may stop within a predetermined time and controls the storage 30 to stop the write operation.

In a case in which the storage 30 does not acquire data from the data output apparatus 70, the storage 30 does not write data. Therefore, the controller 20 may control the storage 30 to stop acquiring data in order to stop the storage 30 from writing data. The controller 20 may also control the data output apparatus 70 to stop outputting data. By stopping the data output apparatus 70 from outputting data, the amount of data outputted unnecessarily is reduced. In a case in which the terminal apparatus 10 includes the second power source 60, the controller 20 may stop the output of data from the data output apparatus 70 by controlling the second power source 60 to stop supplying power from the second power source 60 to the data output apparatus 70. By stopping the power supply to the data output apparatus 70, the amount of power consumed unnecessarily is reduced. The convenience of the terminal apparatus 10 thereby improves.

The controller 20 operates on the power supplied by the first power source 40. Therefore, in the event of a power failure or voltage drop in the first power source 40, the controller 20 may also stop. The controller 20 may include a backup power source that supplies power to the controller 20 itself so that the write operation by the storage 30 can be stopped before the controller 20 itself stops. The storage 30 may include a backup power source that supplies power to the storage 30 itself so that even in the event of a power failure or voltage drop in the first power source 40, the write operation in the storage 30 itself can be completed.

The terminal apparatus 10 may automatically resume operation in a case in which the power supply from the first power source 40 resumes. The controller 20 determines whether the power supply from the first power source 40 has resumed. In a case of determining that the power supply from the first power source 40 has resumed, the controller 20 may control the storage 30 to resume acquiring data from the data output apparatus 70 or to resume writing the acquired data. In a case of determining that the power supply from the first power source 40 has resumed, the controller 20 may control the data output apparatus 70 to resume the output of data.

The controller 20 may be configured to start up automatically in a case in which the power supply from the first power source 40 resumes. The controller 20 may determine that the supply of power from the first power source 40 has resumed based on the controller 20 itself having started up. The controller 20 may determine that the supply of power from the first power source 40 has resumed based on detection of output voltage from the first power source 40 after the controller 20 itself has started up.

As described above, the terminal apparatus 10 according to the present embodiment can stop the writing of data to the medium before the storage 30 stops due to a power failure or voltage drop in the first power source 40. In this way, the storage 30 is less likely to fail. Consequently, the reliability of data storage by the terminal apparatus 10 improves.

In a case in which the power supply from the first power source 40 resumes, the terminal apparatus 10 can cause the storage 30 to resume the writing of data. In this way, the terminal apparatus 10 can easily resume operation from a state of suspension due to a power failure or voltage drop in the first power source 40. By the terminal apparatus 10 easily being able to resume operation, the period of time during which data is not stored on the medium by the storage 30 can be shortened. In other words, the amount of data not stored on the medium can be reduced. Consequently, the reliability of data storage by the terminal apparatus 10 improves.

Flowchart

The terminal apparatus 10 may execute a control method including the procedures of the flowchart illustrated in FIG. 3. The control method may be implemented as a control program executed by the processor that configures the controller 20. The control program may be stored on a non-transitory computer readable medium.

The storage 30 of the terminal apparatus 10 acquires data outputted from the data output apparatus 70 (step S1).

The storage 30 writes the data to the medium (step S2).

The controller 20 of the terminal apparatus 10 monitors the first power source 40 and determines whether a power failure and/or a voltage drop has occurred in the first power source 40 (step S3).

In a case in which neither a power outage nor a voltage drop has occurred in the first power source 40 (step S3: NO), the controller 20 returns to the procedure of step S1. In a case in which a power outage and/or voltage drop has occurred in the first power source 40 (step S3: YES), the controller 20 controls the storage 30 to stop writing data (step S4). Specifically, the controller 20 may control the storage 30 to stop writing regardless of whether data has been outputted from the data output apparatus 70. The controller 20 may control the storage 30 stop acquiring data. The controller 20 may control the data output apparatus 70 to stop outputting data.

The controller 20 determines whether the power supply from the first power source 40 has resumed (step S5). In a case in which the power supply from the first power source 40 has not resumed (step S5: NO), the controller 20 repeats the procedure of step S5. In a case in which the controller 20 has stopped operating due to a power failure or voltage drop in the first power source 40, the controller 20 can resume operations when the power supply from the first power source 40 resumes. In a case in which the controller 20 itself has not resumed operation, the controller 20 may be considered to have determined that the power supply from the first power source 40 has not resumed.

In a case in which the power supply from the first power source 40 has resumed (step S5: YES), the controller 20 returns to the procedure of step S1 and controls the storage 30 to resume acquisition and writing of data.

As described above, according to the control method executed by the terminal apparatus 10 of the present embodiment, the writing of data to the medium is stopped before the storage 30 stops due to a power failure or voltage drop in the first power source 40. In this way, the storage 30 is less likely to fail. Consequently, the reliability of data storage by the terminal apparatus 10 improves.

In a case in which the power supply from the first power source 40 resumes, the writing of data in the storage 30 can be easily resumed. By easy resumption of the writing of data, the period of time during which data is not stored on the medium by the storage 30 can be shortened. In other words, the amount of data not stored on the medium can be reduced. Consequently, the reliability of data storage by the terminal apparatus 10 improves.

Other Embodiments

Example Configuration Including Memory 50

Figure 4:
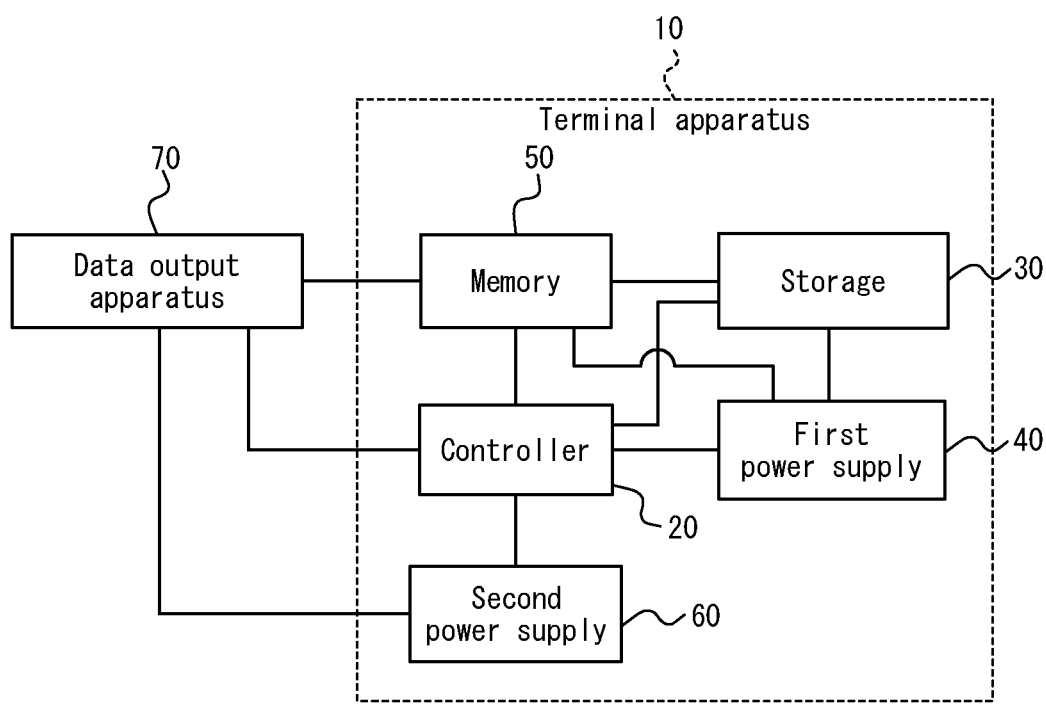
FIG. 4 is a block diagram illustrating an example configuration of a terminal apparatus according to another embodiment.

As illustrated in FIG. 4, a terminal apparatus 10 according to another embodiment further includes a non-essential memory 50. The memory 50 may, for example, be configured to include static random access memory (SRAM), dynamic random access memory (DRAM), flash memory, or the like.

The memory 50 temporarily stores data outputted by the data output apparatus 70 and outputs the data to the storage 30. The storage 30 acquires the data temporarily stored in the memory 50 and writes the data to the medium. The memory 50 operates on the power supplied by the first power source 40. The memory 50 is controlled by the controller 20.

In the event of a power failure or voltage drop in the first power source 40, the memory 50 may also stop. In a case in which the memory 50 stops in the middle of writing data to a memory cell, the memory cell can fail. The data being written to the memory cell may become unreadable.

Even if a power failure or voltage drop in the first power source 40 occurs, the memory 50 can continue to operate for a predetermined time. In a case of detecting that a power failure or voltage drop in the first power source 40 has occurred, the controller 20 of the terminal apparatus 10 stops the write operation by the memory 50 within the predetermined time. In this way, the memory 50 is less likely to fail. Also, by the write operation of the memory 50 being stopped, the storage 30 stops acquiring data and stops writing data to the medium. In this way, the storage 30 is less likely to fail. Consequently, the reliability of data storage by the terminal apparatus 10 improves.

In a case in which the memory 50 does not acquire data from the data output apparatus 70, the memory 50 does not write data. Therefore, the controller 20 may control the memory 50 to stop acquiring data in order to stop the memory 50 from writing data. The memory 50 may include a backup power source that supplies power to the memory 50 itself so that even in the event of a power failure or voltage drop in the first power source 40, the write operation in the memory 50 itself can be completed.

Writing of Data by Controller 20

In the embodiments described above, the storage 30 itself acquires data from the data output apparatus 70 and writes the data to the medium. In another embodiment, the controller 20 may control the write operation by the storage 30 by acquiring data from the data output apparatus 70 and outputting the data to the storage 30. Specifically, by not outputting the data acquired from the data output apparatus 70 to the storage 30, the controller 20 may control the storage 30 to stop the write operation. In a case in which the terminal apparatus 10 includes the memory 50, the controller 20 may control the write operation by the memory 50 by acquiring the data from the data output apparatus 70 and outputting the data to the memory 50. Specifically, by not outputting the data acquired from the data output apparatus 70 to the memory 50, the controller 20 may control the memory 50 to stop the write operation.

Other Configuration Example

The first power source 40 may be configured to include an uninterruptible power supply (UPS). In a case in which the first power source 40 includes a UPS, power failures and voltage drops in the first power source 40 are less likely to occur. However, a power failure or voltage drop in the first power source 40 can occur due to the charge rate of the UPS battery reaching zero. The controller 20 of the terminal apparatus 10 may detect that the charge rate of the UPS is approaching zero and control the storage 30 or memory 50 to stop the write operation.

The terminal apparatus 10 may be used as a gateway terminal to acquire images from a camera as the data output apparatus 70 and record the images on the storage 30. In this way, images are stably recorded by the terminal apparatus 10, which can store data in a highly reliable manner. As a result, the convenience in surveillance applications is improved.

The terminal apparatus 10 may include a lithium ion capacitor as a backup power source. The terminal apparatus 10 may include, as a control circuit for the power discharged from the lithium ion capacitor, a circuit that selects the load to which the power is supplied based on the terminal voltage of the lithium ion capacitor. For example, the control circuit for discharged power may supply power to the entire terminal apparatus 10 in a case in which the terminal voltage of the lithium ion capacitor is a predetermined value or greater. The control circuit for discharged power may stop supplying power to the controller 20 and continue supplying power only to the storage 30 in a case in which the terminal voltage of the lithium ion capacitor falls below the predetermined value. In this way, the storage 30 is less likely to stop while data is being written. The storage 30 is thereby less likely to fail.

Although embodiments of the present disclosure have been described through drawings and examples, it is to be noted that various changes and modifications will be apparent to those skilled in the art based on the present disclosure. Therefore, such changes and modifications are to be understood as included within the scope of the present disclosure. For example, the functions or the like included in the various components or steps may be reordered in any logically consistent way. Furthermore, components or steps may be combined into one or divided.

The invention claimed is:

1. A terminal apparatus comprising:
    a storage configured to write data outputted from a data output apparatus to a medium;
    a controller configured to control the storage; and
    a first power source configured to supply power to the controller and the storage,
    wherein
        the first power source comprises a battery, and
        the controller is configured to control the storage to stop writing the data when detecting that a charge rate of the battery is approaching zero as a sign of an occurrence of at least one of a power outage or a voltage drop in the battery.

2. The terminal apparatus according to claim 1, further comprising
    a memory configured to store the data temporarily and output the data to the storage, wherein
    the controller is configured to control the memory to stop writing the data in a case in which a power outage and/or a voltage drop in the first power source is detected.

3. The terminal apparatus according to claim 2, wherein the controller is configured to control the data output apparatus to stop outputting the data in a case in which a power outage and/or a voltage drop in the first power source is detected.

4. The terminal apparatus according to claim 3, wherein the terminal apparatus is used as a gateway terminal to acquire and record image data from a camera as the data output apparatus.

5. The terminal apparatus according to claim 2, wherein the terminal apparatus is used as a gateway terminal to acquire and record image data from a camera as the data output apparatus.

6. The terminal apparatus according to claim 1, wherein the controller is configured to control the data output apparatus to stop outputting the data in a case in which a power outage and/or a voltage drop in the first power source is detected.

7. The terminal apparatus according to claim 6, wherein the terminal apparatus is used as a gateway terminal to acquire and record image data from a camera as the data output apparatus.

8. The terminal apparatus according to claim 1, wherein the terminal apparatus is used as a gateway terminal to acquire and record image data from a camera as the data output apparatus.

9. A terminal apparatus comprising:
a storage configured to write data outputted from a data output apparatus to a medium;
a controller configured to control the storage; and
a first power source configured to supply power to the controller and the storage, wherein
the controller is configured to control the storage to stop writing the data in a case in which a power outage and/or a voltage drop in the first power source is detected,
the controller is configured to control the data output apparatus to stop outputting the data in a case in which a power outage and/or a voltage drop in the first power source is detected,
the terminal apparatus further comprises
a second power source configured to supply power to the data output apparatus, and
the controller is configured to stop supply of power from the second power source to the data output apparatus in a case in which a power outage and/or a voltage drop in the first power source is detected.

10. The terminal apparatus according to claim 9, wherein the terminal apparatus is used as a gateway terminal to acquire and record image data from a camera as the data output apparatus.

11. A terminal apparatus comprising:
a storage configured to write data outputted from a data output apparatus to a medium;
a controller configured to control the storage; and
a first power source configured to supply power to the controller and the storage, wherein
the controller is configured to control the storage to stop writing the data in a case in which a power outage and/or a voltage drop in the first power source is detected,
the terminal apparatus further comprises a memory configured to store the data temporarily and output the data to the storage,
the controller is configured to control the memory to stop writing the data in a case in which a power outage and/or a voltage drop in the first power source is detected,
the controller is configured to control the data output apparatus to stop outputting the data in a case in which a power outage and/or a voltage drop in the first power source is detected,
the terminal apparatus further comprises
a second power source configured to supply power to the data output apparatus, and
the controller is configured to stop supply of power from the second power source to the data output apparatus in a case in which a power outage and/or a voltage drop in the first power source is detected.

12. The terminal apparatus according to claim 11, wherein the terminal apparatus is used as a gateway terminal to acquire and record image data from a camera as the data output apparatus.

* * * * *